W. M. COFFMAN.
THRUST BEARING.
APPLICATION FILED FEB. 27, 1906.
996,457.
Patented June 27, 1911.
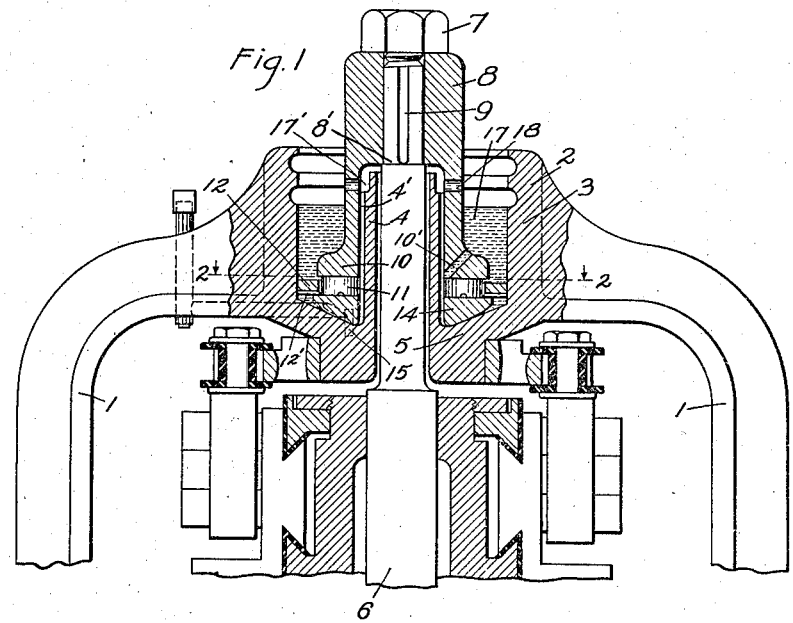
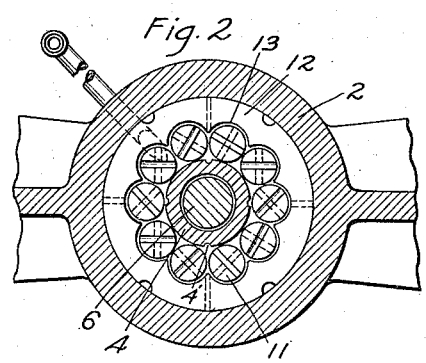
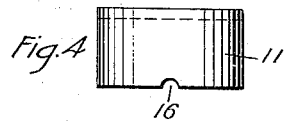
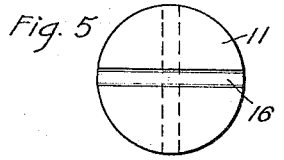
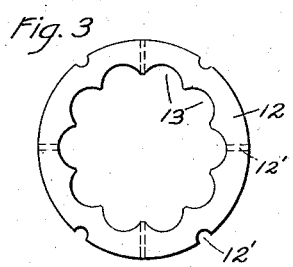
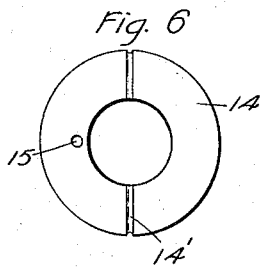
Witnesses;
Inventor;
Walter M. Coffman
By
Att'y.

UNITED STATES PATENT OFFICE.

WALTER M. COFFMAN, OF MADISON, WISCONSIN, ASSIGNOR, BY MESNE ASSIGNMENTS, TO GENERAL ELECTRIC MPANY, A CORPORATION OF NEW YORK.

THRUST-BEARING.

996,457. Specification of Letters Patent. Patented June 27, 1911.

Application filed February 27, 1906. Serial No. 303,168.

*To all whom it may concern:*

Be it known that I, WALTER M. COFFMAN, a citizen of the United States, residing at Madison, county of Dane, State of Wisconsin, have invented certain new and useful Improvements in Thrust-Bearings, of which the following is a specification.

My present invention relates to bearings for rotating shafts, and particularly to a bearing which is intended to take a thrust in the direction of the axis of the shaft journaled in it, due either to the weight of the shaft and parts carried by it or to other causes.

My invention comprises certain novel features of construction and arrangement hereinafter pointed out with particularity in the claims annexed to and forming a part of this specification.

For a better understanding of my invention and the advantages possessed by it, reference may be had to the accompanying drawings and descriptive matter in which I have illustrated and described forms in which my invention may be embodied.

Of the drawings, Figure 1 is an elevation partly in section of the thrust bearing and support therefor of a vertical shaft dynamo electric machine; Fig. 2 is a plan view on the line 2 2 of Fig. 1; Fig. 3 is a plan view of the spacing device for the disks; Fig. 4 is an elevation and Fig. 5 a plan view of one of the bearing disks, and Fig. 6 is an inverted plan view of the bottom support for the bearing disks.

Referring to the construction shown in the drawings, 1 represents the arms of the upper bonnet or end member of a vertical shaft dynamo electric machine which support at their upper ends a bearing box 2. As shown, the bearing box 2 may be integral with the arms 1 and is usually formed of cast iron. The bearing box 2 comprises an outer cylindrical wall 3, an inner cylindrical wall 4, and a bottom wall 5. The inner wall 4 forms a tubular boss surrounding the upper end of the armature shaft 6 which passes through it.

To the upper end of the rotating armature shaft 6 is secured by a nut 7 a bearing member 8 which may be formed of any suitable material such as hardened bronze. The member 8 comprises an upper portion which fits tightly about the portion of the shaft 6 above the upper end of the inner wall 4 of the bearing box. As shown, the portion of the shaft engaged by the member 8 may be reduced in diameter somewhat to form a shoulder 8'. The bearing member and shaft may be connected together by a key resting in the keyway 9 formed in the shaft. The bearing member 8 also comprises a lower portion which surrounds the inner wall 4 of the bearing box. This portion of the member 8 terminates in an enlarged lower end 10 having an under annular, radial surface. Oil passages 10' are formed in the portion 10.

The lower end 10 of the member 8 rests upon a number of disk-like members 11 which are arranged in a circle about the tubular boss 4 and are positioned by an annular spacing member 12 having disk receiving pockets 13 formed in its inner surface and oil grooves 12' formed in its under and outer surfaces. The member 12 rests upon the outer edge of an annular member 14 which may be formed of any suitable material such as hardened bronze and is secured against rotation by one or more dowel pins 15 which project upward from the bottom wall 5 of the bearing box, upon which the member 14 rests, and are loosely received in holes formed in the member 14. The under side of the member 14 is spherical and the coöperating portion of the upper surface of the bottom wall 5 is inclined. By this arrangement the member 14 serves as an equalizing ring or support free to shift sufficiently to equalize the pressure upon the various disks 11 due to the weight of the armature shaft and parts carried by it. Oil grooves 14' are formed in the under side of the member 14. The disks 11 which are formed of suitable material such as hardened steel, have diametrically extending grooves 16 formed one on each flat side of each disk. As shown, the grooves on opposite sides of each disk are at right angles to each other.

In operation, the rotation of the shaft 6 and the bearing member 8 causes the disks 11 to rotate slowly about their own axes since the outer edge of the end 10 of the bearing member has a higher linear velocity than the inner edge. The disks and member 12 also rotate slowly bodily about the boss 4. As a result, the oil 17 in the chambered bearing box in which the disks are immersed is fed through the grooves 16 and properly distributed over all the bearing surfaces. The rotation of the disks also causes the bearing surfaces to wear uniformly and prevents them from becoming grooved; in fact they serve to polish the surfaces contacted by them.

By the arrangement shown, the lubricating material is retained within the chambered bearing and cannot injure the parts of the dynamo electric machine by flowing down the shaft. The shaft is positioned against lateral displacement by making the inner surface of the lower portion of the member 8 a bearing sleeve for the tubular wall 4. As shown, vertical oil grooves 4' are formed in the surface of the member 4. These terminate in an annular groove 17' formed in the outer surface of the upper end of the portion 4. Passages 18 are formed in the member 8 adjacent the grooves 17'. Oil forced upward between the outer surfaces of the portions 4 of the boxes and the inner surfaces of the adjacent portions of the member 8 collects in the groove 17' from which it passes back into the oil chamber proper, through the openings 18.

What I claim as new and desire to secure by Letters Patent of the United States, is,—

1. In combination, a rotating shaft and a thrust bearing therefor comprising a bearing box having a sleeve like portion surrounding the shaft, an equalizing member supported by the bearing box, a series of disks one flat side of each of which engages said member, and a second member surrounding the sleeve, said second member being secured to the shaft and engaging with its end the sides of the disks remote from the equalizing member.

2. In combination, a rotating member provided with a radially extending thrust bearing surface, a series of disks one flat side of each of which engages said surface, and a stationary supporting member therefor against which the other flat side of each disk bears.

3. In combination, a vertical shaft, a member fastened thereto provided with a horizontal bearing surface, a support for the shaft also provided with a horizontal bearing surface, and a series of disks with their flat sides horizontal arranged in a circle about said shaft and between said bearing surfaces.

4. In combination, a vertical shaft, a member fastened thereto provided with a horizontal bearing surface, a support for the shaft also provided with a horizontal bearing surface, and a series of disks with their flat sides horizontal arranged in a circle about said shaft and between said bearing surfaces, said disks having oil grooves extending across their faces.

5. In combination, a shaft, a member fastened thereto provided with a bearing surface extending transversely to the axis of said shaft, a coöperating member provided with a parallel bearing surface and an interposed bearing member in the form of a plurality of disks, the flat sides of which engage with said surfaces, each of said disks having a groove formed in one of its faces.

6. In combination, a shaft, a member fastened thereto provided with a bearing surface extending transversely to the axis of said shaft, a coöperating member provided with a parallel bearing surface and interposed bearing members in the form of disks the flat sides of which are parallel to said surfaces, each of said disks having a groove formed in one of its faces, and a spacing device provided with a pocket for each disk.

7. In combination, a shaft, a member fastened thereto provided with a bearing surface extending transversely to the axis of said shaft, a coöperating member provided with a parallel bearing surface, supporting means for said member permitting it to adjust its bearing surface to maintain its parallelism to the bearing surface of the member fastened to said shaft, and a plurality of disks surrounding said shaft and arranged between said bearing surfaces.

In witness whereof, I have hereunto set my hand this 21st day of Feby., 1906.

WALTER M. COFFMAN.

Witnesses:
  H. L. MORRIS,
  A. REGAN.

---

Copies of this patent may be obtained for five cents each, by addressing the "Commissioner of Patents. Washington, D. C."